United States Patent
Falk et al.

(10) Patent No.: US 8,959,333 B2
(45) Date of Patent: Feb. 17, 2015

(54) METHOD AND SYSTEM FOR PROVIDING A MESH KEY

(75) Inventors: Rainer Falk, Erding (DE); Florian Kohlmayer, Starnberg (DE)

(73) Assignee: Nokia Siemens Networks GmbH & Co. KG, Munich (DE)

(*) Notice: Subject to any disclaimer, the term of this patent is extended or adjusted under 35 U.S.C. 154(b) by 1534 days.

(21) Appl. No.: 12/303,095

(22) PCT Filed: May 29, 2007

(86) PCT No.: PCT/EP2007/055206
§ 371 (c)(1),
(2), (4) Date: Aug. 20, 2009

(87) PCT Pub. No.: WO2007/138060
PCT Pub. Date: Dec. 6, 2007

(65) Prior Publication Data
US 2009/0307483 A1     Dec. 10, 2009

(30) Foreign Application Priority Data

Jun. 1, 2006   (DE) .................. 10 2006 025 691
Aug. 2, 2006   (DE) .................. 10 2006 036 109

(51) Int. Cl.
*H04L 29/06*     (2006.01)
*H04W 12/06*    (2009.01)
*H04W 12/04*    (2009.01)

(52) U.S. Cl.
CPC .......... *H04L 63/0435* (2013.01); *H04L 63/062* (2013.01); *H04W 12/06* (2013.01); *H04W 12/04* (2013.01)
USPC ........... 713/154; 713/150; 713/151; 713/152; 713/153; 380/277; 380/278; 380/279; 380/280; 380/281; 380/282; 380/283; 380/284; 380/285; 380/286; 726/27; 726/28; 726/29; 726/30

(58) Field of Classification Search
USPC ........ 380/277–286; 713/150–154; 726/27–30
See application file for complete search history.

(56) References Cited

U.S. PATENT DOCUMENTS

| | | | |
|---|---|---|---|
| 7,787,627 B2 * | 8/2010 | Sood et al. .................... 380/277 |
| 2005/0050328 A1 | 3/2005 | Mizrah | |
| 2005/0138355 A1 | 6/2005 | Chen et al. | |
| 2005/0152305 A1 | 7/2005 | Ji et al. | |
| 2007/0101406 A1 * | 5/2007 | Zavalkovsky et al. ............. 726/4 |
| 2007/0189249 A1 * | 8/2007 | Gurevich et al. ............. 370/338 |
| 2007/0260885 A1 * | 11/2007 | Yegani et al. ................. 713/171 |
| 2009/0217033 A1 * | 8/2009 | Costa et al. ................... 713/155 |

OTHER PUBLICATIONS

M. Raepple "Sicherheitskonzepte fur das Internet." 1998, pp. 183-186.
A. Hagedorn et al. "IEEE 802.11i—Sicherheit in drahtlosen lokalen Netzen", Nov. 2003, pp. i-X., 1-92.
Extensible Authentication Protocol (EAP) Key Management Framework, section 1.3 and 1.4, Internet Draft, May 1, 2006. http://www.ietf.org/internet-drafts/draft-ietf-eap-keying-13.txt.
IEEE P802.11s Draft 0.01, Section 11A.5 Security; Mar. 2006.

* cited by examiner

*Primary Examiner* — Josnel Jeudy
(74) *Attorney, Agent, or Firm* — Staas & Halsey LLP

(57) ABSTRACT

Method for providing a mesh key which can be used to encrypt messages between a first node and a second node of a mesh network, wherein a session key is generated when authenticating the first node in an authentication server, the first node and the authentication server or an authentication proxy server using a predefined key derivation function to derive the mesh key from said session key, which mesh key is transmitted to the second node.

22 Claims, 4 Drawing Sheets

METHOD AND SYSTEM FOR PROVIDING A MESH KEY

CROSS REFERENCE TO RELATED APPLICATIONS

This application is based on and hereby claims priority to PCT Application No. PCT/EP2007/055206 filed on May 29, 2007, German Application No. 10 2006 025 691.3 filed on Jun. 1, 2006 and German Application No. 10 2006 036 109.1, filed on Aug. 2, 2006, the contents of which are hereby incorporated by reference.

BACKGROUND OF THE INVENTION

The invention relates to a method and to a system for providing a key for encrypting messages between nodes of a mesh network.

A wireless mesh network is an intermeshed network which, for example, is implemented in a wireless local area network (WLAN). In a mesh network, a mobile node can forward to a further mobile node, or transmit to a base station, data which come from another mobile node. In a mesh network, long distances can be spanned, particularly in uneven or difficult terrain. In addition, mesh networks operate very reliably since every mobile node is connected to some other nodes. If a node fails, for example due to a hardware defect, its neighboring nodes look for an alternative data transmission route. Mesh networks can incorporate fixed or mobile devices.

FIG. 1 shows diagrammatically a mesh network of the related art. The nodes comprise dedicated mesh nodes (MN) which belong to the infrastructure of the network. These dedicated mesh nodes can be a fixed base station BS but also a mobile station MS. Apart from the dedicated mesh nodes, the mesh network also comprises mobile terminals or mobile nodes of users. The mobile nodes can communicate directly with another mobile node and/or directly or indirectly exchange via further nodes data with a base station BS which is connected to a gateway GW of a data network. In this arrangement, data packets DP are forwarded from one device or node to the next device until the destination device or the gateway GW is reached. Forwarding of the data packet DP is done by dynamic routing. In this arrangement, the routes on which the data packets DP are transmitted are calculated dynamically on the basis of the availability of the nodes and on the basis of the network usage. Generally, mesh networks are distinguished by a high network coverage, high reliability and by economic handling of available resources. In wireless mesh networks, the wireless transmission link is normally implemented by a WLAN (Wireless Local Area Network) transmission link. In contrast to a wireless personal area network (WPAN), WLAN networks have greater transmitting powers and ranges and offer higher data transmission rates.

To authenticate nodes or computers, the so-called EAP (Extensible Authentication Protocol) is used. FIG. 2 shows a signal diagram for representing an authentication process in a conventional WLAN network. The EAP protocol is used for protecting the network access in WLAN. Many types of actual authentication methods, so-called EAP methods, can be transported via the EAP protocol, e.g. EAP-TLS, EAP-AKA, PEAP-MSChapv2. During the authentication, a cryptographic key or session key MSK (Master Session Key), EMSK (Extended Master Session Key) is determined which is subsequently used for protecting the data communication, for example during the link layer encryption. A subscriber is authenticated between the subscriber (supplicant) and an authentication server (AAA server). When the authentication is successful, the authentication server sends the result of the authentication and the session key MSK coming from the authentication to the authenticator, for example a WLAN access point AP. Communication between the access node or access point AP and the authentication server usually takes place via the radius or diameter data transmission protocol. In this arrangement, the session key MSK is sent as data attribute to the access node AP as part of an EAP success message. The transmitting session key MSK is subsequently used via an 802.11 4-way handshake 4WHS between the subscriber and the access node according to the 802.11 IEEE standard.

In a conventional network, the access node AP is a trustworthy node, i.e. a node of the network infrastructure. The access node is thus not an end user node in a conventional network.

FIG. 3 shows the authentication of two nodes MPA, MPB in a conventional WLAN network. The two nodes MPA, MPB can be, for example, two mesh nodes of a mesh network. To set up a data link between the two nodes MPA, MPB, the end node MPA (as supplicant) first authenticates itself with the associated authentication server AS-B by the EAP data transmission protocol. The node MPB (authenticator) receives a session key MSK1 in an EAP success message. The node MPB subsequently carries out a 4-way handshake with the node MPA and in doing so uses the session key MSK1 received. Following this, the node MPB (now as supplicant) performs an authentication at the associated authentication server AS-A and MPA (now authenticator) receives a second session key MSK2 in an EPA success message. Following this, the node MPA performs a 4-way handshake with the node MPB by using the second session key MSK2.

During the further communication between the two nodes MPA, MPB, this can be protected by one of the two session keys MSK1, MSK2.

One disadvantage of the procedure of the related art, shown in FIG. 3, relates to the nodes MPA, MPB being mesh nodes which are not part of the network infrastructure and can thus be manipulated.

For example, during an authentication of a mesh node MPA at its authentication server, an EAP authentication message can be forwarded via another mesh node MPB which uses the received session key MSK1 for manipulation purposes. For example, the mesh node MPB can use the received session key MSK for other services and pretend to the other mesh node MPA that it is, for example, a VPN (Virtual Private Network) server. From the point of view of the mesh node MPA, the manipulated node MPB will behave like a VPN server of a company intranet.

SUMMARY

It is one possible object, therefore, to create a method and a system for providing a mesh key which can be used for encrypting messages between two nodes of a mesh network, in which manipulation is eliminated.

The inventors propose a method for providing a mesh key which can be used for encrypting messages between a first node and a second node of a mesh network, wherein a session key is generated during an authentication of the first node at an authentication server, the first node and the authentication server or an authentication proxy server using a predefined key derivation function to derive the mesh key from said session key, which mesh key is transmitted to the second node.

In the preferred embodiment of the proposed method, the authentication server is formed by an AAA server.

In a further embodiment of the method, the AAA proxy server is provided in a mesh gateway node.

In a preferred embodiment of the method, the session key is formed by an MSK key (Master Session Key).

In one embodiment of the method, the key derivation function KDF is formed by a cryptographic hash function.

In a preferred embodiment of the method, the key derivation function KDF is formed by an HMAC-SHA1, HMAC-MD5, HMAC-SHA256, PRF, SHA-1, MD5 or SHA256 function.

In a further embodiment of the method, the mesh key is derived by a derivation function KDF in dependence on the session key and on a string.

The string is preferably composed of several concatenated substrings.

In a preferred embodiment of the method, a substring is formed by a network identification of the mesh network.

In one embodiment of the method, a substring is formed by a MAC address of the second node.

In a preferred embodiment of the method, during a transmission of the mesh key to the second node, a flag indicates that the transmitted key is a mesh key.

In one embodiment of the method, the first node is authenticated in accordance with an EAP protocol.

In a preferred embodiment of the method, the second node exchanges messages with the authentication server in accordance with the radius or diameter protocol.

In the method, instead of the generated session key, a mesh key derived therefrom is provided for the second node.

In one embodiment of the method, the authentication server is also used for further authentications which relate to other communications than the communication between the mesh nodes.

In this context, in the case of authentications which relate to the other communications, generated session keys are preferably provided. The mesh key can preferably not be used as session key for the other communications.

The inventors also propose a system for providing a mesh key which can be used for encrypting messages between a first node and a second node of a mesh network, wherein a session key is generated during an authentication of the first node at an authentication server, the first node and the authentication server or an authentication proxy server using a predefined key derivation function to derive the mesh key from said session key, which mesh key can be transmitted to the second node.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
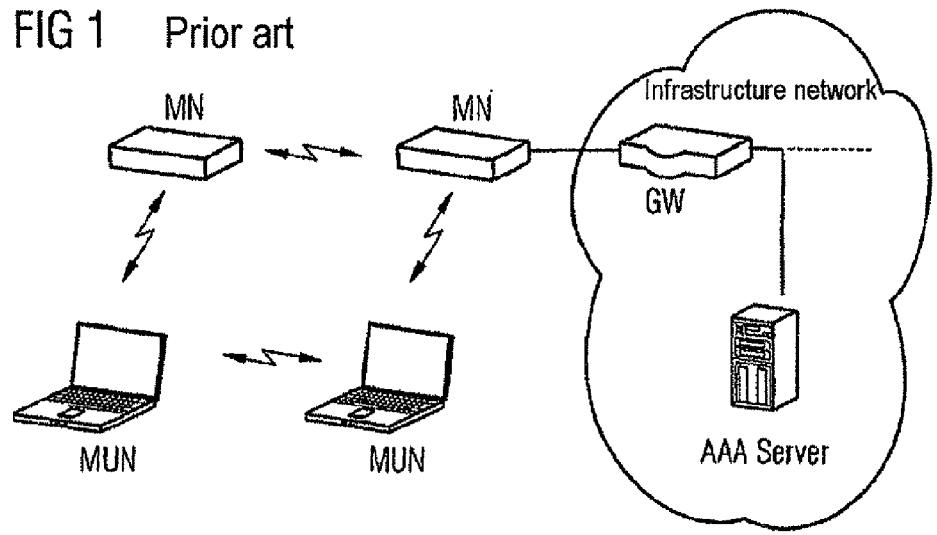
FIG. 1 shows a mesh network of the prior art.
Figure 2:
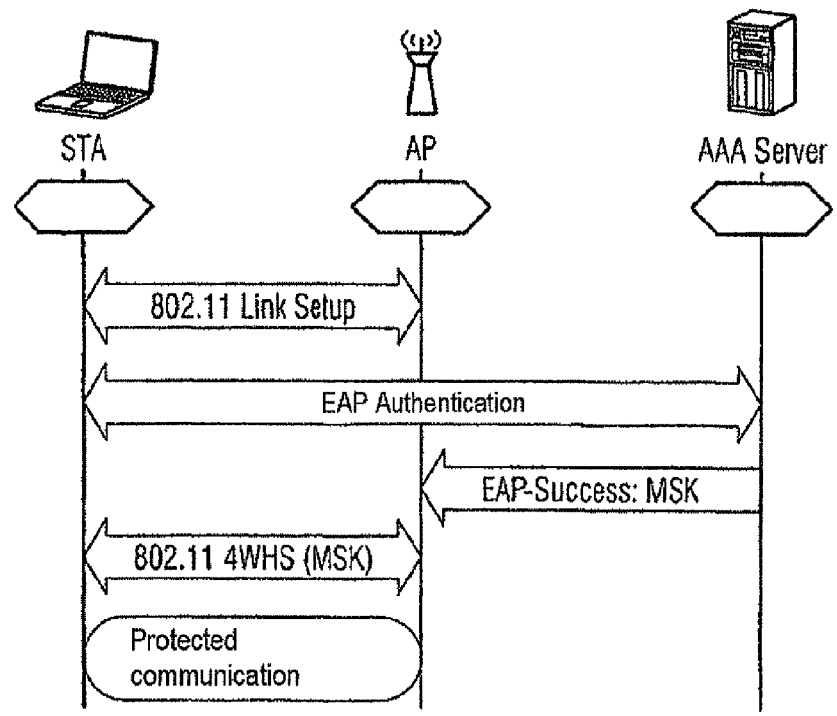
FIG. 2 shows a diagram for explaining the authentication process during a normal WLAN network access.
Figure 3:
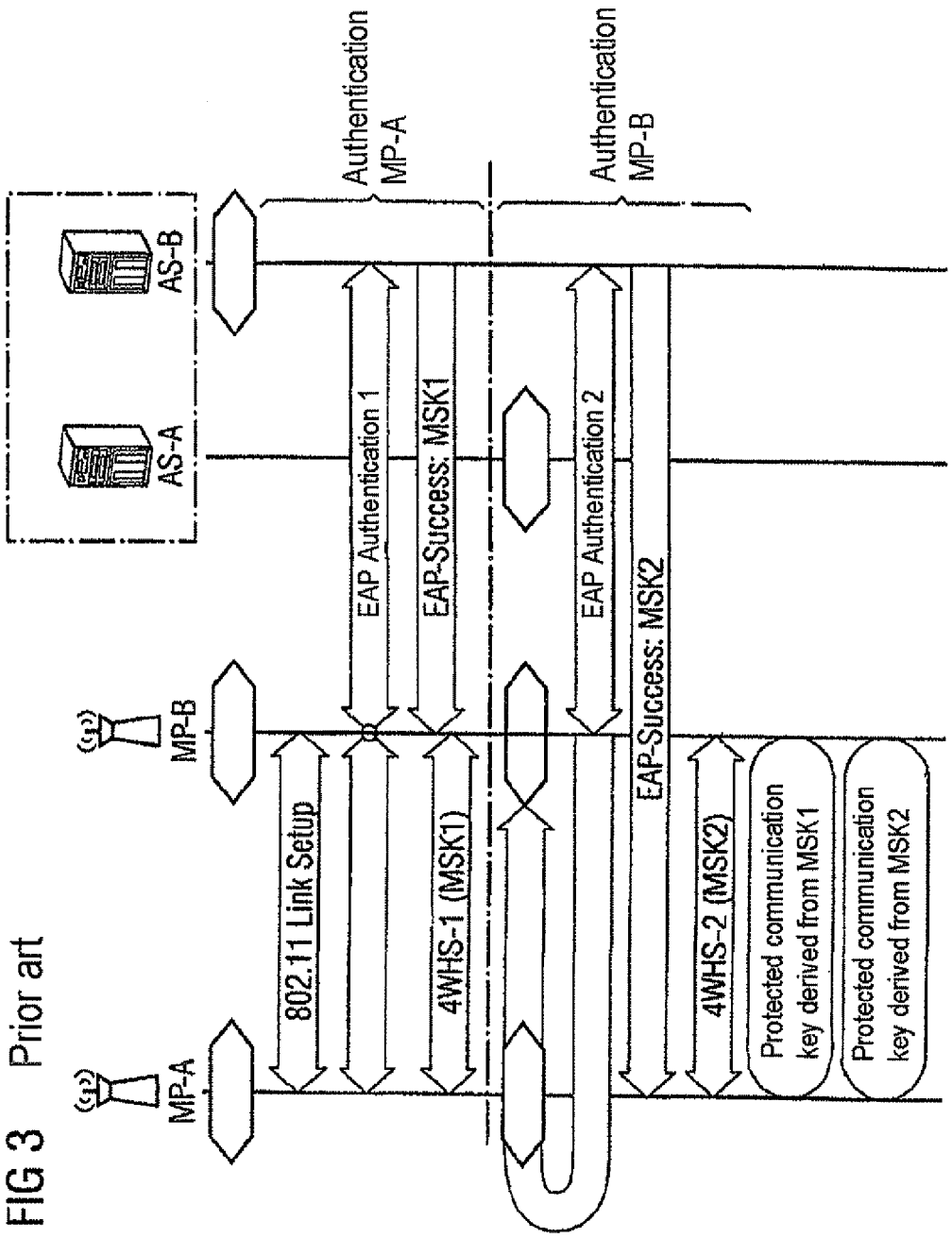
FIG. 3 shows a further diagram for explaining the authentication process during a normal WLAN network access for two nodes of a mesh network.

Reference will now be made in detail to the preferred embodiments of the present invention, examples of which are illustrated in the accompanying drawings, wherein like reference numerals refer to like elements throughout.

Figure 4:
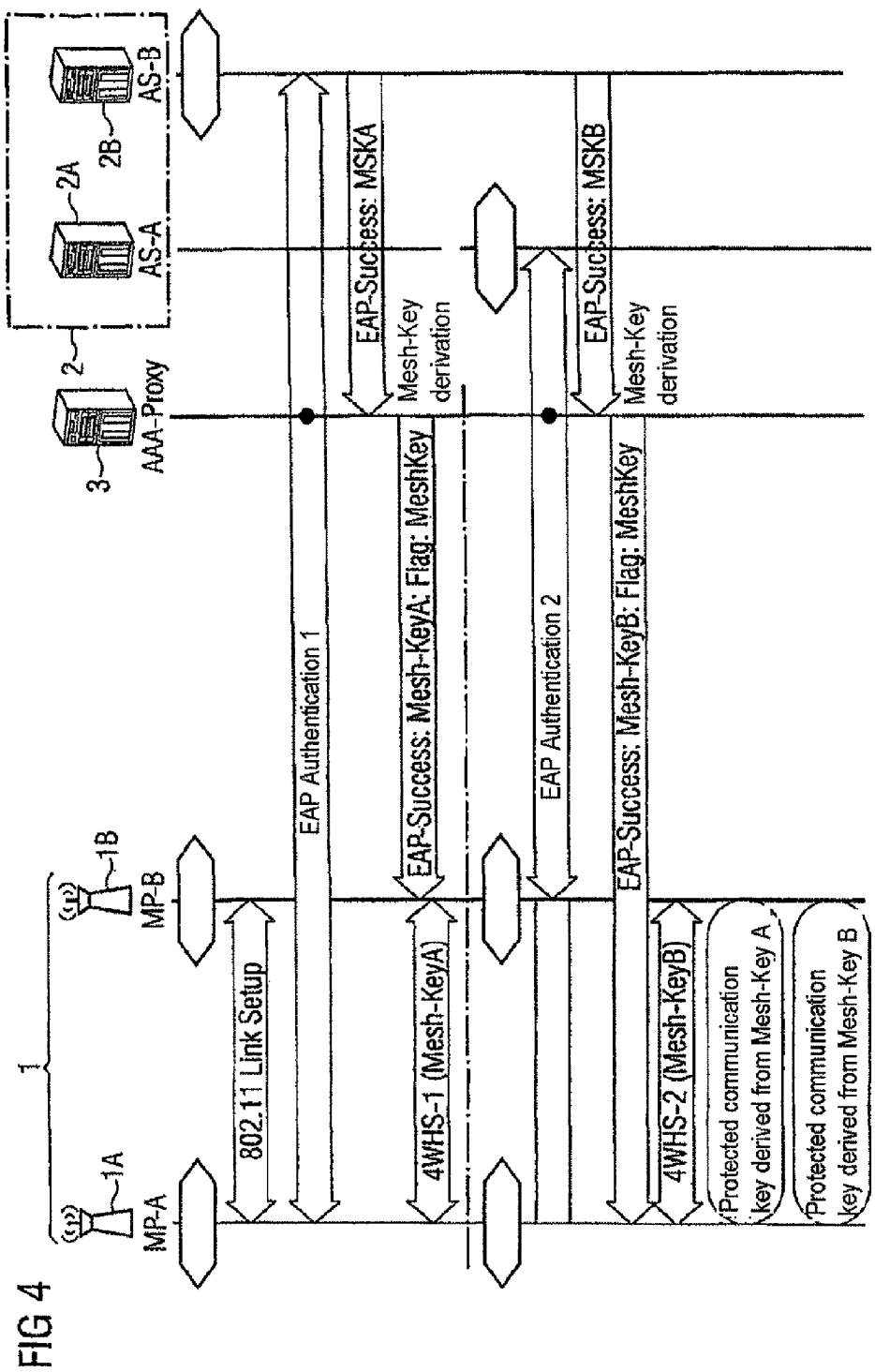
FIG. 4 shows a signal diagram for explaining a first embodiment of the proposed method for providing a mesh key.

As can be seen from FIG. 4, a mesh network contains at least two nodes 1A and 1B which can communicate directly with one another. The mesh nodes 1A, 1B can be mobile terminals but also fixed stations. A node 1A, 1B is authenticated by an associated authentication server 2. In this arrangement, the nodes 1A, 1B can have a common authentication server 2 or locally separate authentication servers 2A, 2B can be provided for the respective node 1A, 1B. In the embodiment shown in FIG. 4, the authentication process is carried out via an authentication proxy server 3 which is preferably located in a gateway node GW of an access network. The authentication of a network node 1A is carried out at the authentication server 2 by the EAP data protocol in which the network node 1A transfers an associated subscriber identity NAI to its authentication server 2 which reads an associated session key MSK from a table, or which is generated by the EAP data protocol as part of the authentication. In the method proposed by the inventors, the session key MSK-A for the network node 1A is transferred to the authentication proxy server 3 in an EAP success message as can be seen in FIG. 4. The authentication proxy server 3 derives from the received session key MSK-A an unambiguous mesh key (mesh key A) by a key derivation function KDF and transmits it to the second node 1B within an EAP success message.

In a preferred embodiment, an indicator flag is additionally transferred to the second node 1B which indicates that the transmitted key is a mesh key. This is followed by a 4-way handshake between the two nodes 1A, 1B by using the transmitted mesh key (mesh key A). The derived mesh key is used for protecting the transmitted messages in the mesh network, and not for other services such as, for example, VPN.

The authentication of the second node 1B at the associated authentication server 2 is carried out in the same manner as in the case of the first node 1A. After transferring a subscriber identity NAI of the second node 1B, the authentication server 2 reads out an associated session key MSK-B or determines it as part of the authentication by the EAP data protocol and transfers it to the authentication proxy server 3. The derivation of the mesh key (mesh key B) by the derivation function KDF is carried out by the authentication proxy server 3 which transfers the derived mesh key (mesh key B) with an associated indicator flag in an EAP success message to the other node 1A. This is followed by a 4-way handshake between the two nodes 1A, 1B which is protected by the second mesh key (mesh key B).

Following this, a protected data transmission or communication is possible between the two nodes 1A, 1B by using one of the two or using both mesh keys (mesh key A, mesh key B).

Figure 5:
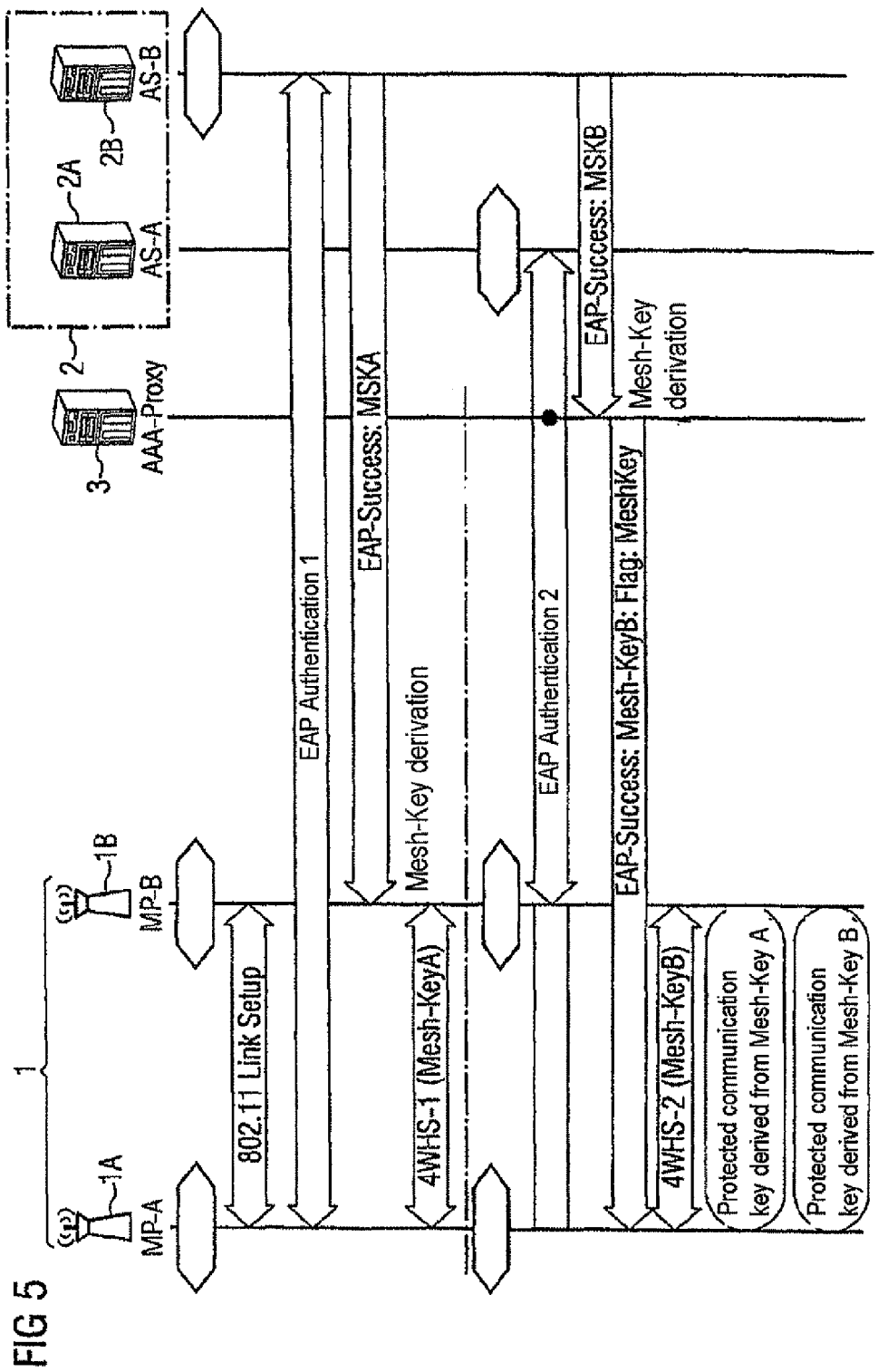
FIG. 5 shows a further signal diagram for explaining a further embodiment of the proposed method for providing a mesh key.

FIG. 5 shows a further signal diagram for explaining the proposed method for providing a mesh key. In the example shown in FIG. 5, the authentication proxy server 3 is not linked into the communication between the authenticator 1B and the authentication server 2B during the authentication of the first node 1A. In this embodiment, the authentication server 3 does not therefore perform the mesh key derivation function. Instead, the second node 1B receives the session key MSK-A directly. If the EAP success message received from the node 1B does not contain an indicator flag which indicates that the key is a mesh key, the node 1B recognizes that the derivation function KDF is still to be performed. Node 1B therefore derives from the received session key MSK-A the mesh key (mesh key A) by a predetermined derivation function KDF. During the subsequent authentication of the other node, the authentication is carried out via the authentication proxy server 3 as already shown in FIG. 4. The second mesh key (mesh key B) is correspondingly derived by the authentication proxy server 3.

In a further embodiment, the authentication of both nodes 1A, 1B is carried out directly without the aid of an authentication proxy server 3, the key being in each case derived by the other node.

In the method, a further key is derived by a predetermined key derivation function KDF from the session key read out or generated in the authentication process, the original session key no longer being reconstructable by the derived mesh key. The additional key derivation increases the security since a node in the intermeshed network only receives a derived mesh key which can only be used within a mesh network but not for other applications, for which a separate authentication is carried out.

In this arrangement, the existing authentication infrastructure is used in the method.

In a preferred embodiment of the method, the generated session key is formed by a master session key (MSK).

The key derivation function KDF is preferably a cryptographic hash function. In this arrangement, an HMAC-SHA1, HMAC-MD5, HMAC-SHA256, PRF, SHA-1, MD5 or SHA256 function is preferably used as key derivation function. It is not possible to infer the original session key MSK from the mesh key derived by the cryptographic key derivation function KDF. This prevents a mesh node from deriving the session key from the mesh key and using it for manipulation purposes.

The actual key derivation can be carried out, on the one hand, by an authentication proxy server 3 or authentication server 2 or, on the other hand, by a node of the mesh network. The key derivation is preferably performed by an authentication proxy server 3, i.e. a radius proxy server or a diameter proxy server which forms a part of a gateway node and thus belongs to the network infrastructure.

In an alternative embodiment, the key derivation of the mesh key can already be carried out by the authentication server 2 itself. In this embodiment the session key MSK can be used for, as an alternative, also an extended session key EMSK (Extended MSK). The mesh key is derived from the extended session key by the authentication server 2.

In a further embodiment of the method, the authentication server 2 can transfer the session key MSK and the mesh key derived from it. The authentication proxy server 3 can then simply delete or ignore the session key MSK not required.

In a preferred embodiment of the method, the mesh key is derived by a key derivation function KDF in dependence on the session key MSK and a string.

In this context, the string can be composed of several substrings. In this context, a substring is preferably formed by a network identification of the mesh network (mesh ID).

A further substring is preferably formed by a MAC address of a mesh node (MAC Auth).

The key derivation of the mesh key (mesh MSK) is obtained, for example, as follows:
Mesh-MSK=HMAC-SHA1 (MSK, "Mesh-MSK|MAC-Auth|Mesh-ID")

where the symbol "|" stands for the concatenation of the substrings.

The additional key derivation according to the method significantly increases the security of the data transmission since the authenticator mesh node only receives a derived key which can only be used within a mesh network but not for other applications in which a separate EAP authentication also takes place.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A method of providing a mesh key used to encrypt messages between a first node and a second node of a mesh network, comprising:
   generating a session key during an authentication of the first node at an authentication server; and
   deriving the mesh key from the session key,
   the first node and either the authentication server or an authentication proxy server deriving the mesh key using a key derivation function, the mesh key being able to be transmitted to the second node,
   wherein the step of deriving the mesh key from the session key by means of the key derivation function is carried out by the authentication server or the authentication proxy server wherein the derived mesh key is transferred to the second node with an associated indicator flag in an extensible authentication protocol success message, and
   recognizing by the second node that the key derivation function is still to be performed if said message does not contain the associated indicator flag.

2. The method as claimed in claim 1, wherein the authentication server is formed by an authentication, authorization and accounting (AAA) server.

3. The method as claimed in claim 1, wherein the AAA proxy server is provided in a mesh gateway node.

4. The method as claimed in claim 1, wherein the generated session key is formed by a Master Session Key.

5. The method as claimed in claim 1, wherein the key derivation function is formed by a cryptographic hash function.

6. The method as claimed in claim 5, wherein the key derivation function is formed by a Hash Message Authentication Code (HMAC)-Secure Hash Algorithm 1 (SHA1), an HMAC-Message-Digest Algorithm (HMAC-MD5), an HMAC-SHA256, a Pseudo-Random Function (PRF), an SHA-1, an MD5 or an SHA256 function.

7. The method as claimed in claim 1, wherein the mesh key is derived by a key derivation function in dependence on the session key and a string.

8. The method as claimed in claim 7, wherein the string includes several concatenated substrings.

9. The method as claimed in claim 8, wherein at least one of the substrings is formed by a network identification of the mesh network.

10. The method as claimed in claim 8, wherein at least one of the substrings is formed by a Media Access Control (MAC) address of the second node.

11. The method as claimed in claim 1, wherein during transmission of the mesh key to the second node, said flag indicating that the transmitted key is a mesh key.

12. The method as claimed in claim 1, wherein the second node exchanges messages with the authentication server in accordance with a Remote Authentication Dial in User Service (RADIUS) or a DIAMETER protocol.

13. The method as claimed in claim 1, wherein the mesh key derived from the generated session key is provided for the second node instead of the generated session key.

14. The method as claimed in claim 1, wherein the authentication server is also used for further authentications which relate to communications other than those between the first node and the second node of the mesh network.

15. The method as claimed in claim 14, wherein a generated session key is provided in the case of authentications which relate to communications other than the communication between the first node and the second node of the mesh network.

16. A system to provide a mesh key used to encrypt messages between a first node and a second node of a mesh network, comprising:
an authentication hardware server generating a session key during an authentication of the first node,
wherein the first node and either the authentication hardware server or an authentication proxy hardware server use a predefined key derivation function to derive the mesh key from the session key, and the mesh key being able to be transmitted to the second node, and
wherein the derivation of the mesh key from the session key by means of the key derivation function is carried out by the authentication hardware server or the authentication proxy hardware server which transfers the derived mesh key with an associated indicator flag in an extensible authentication protocol success message to the second node, and
the second node recognizing that the key derivation function is still to be performed if said message does not contain the associated indicator flag.

17. The system as claimed in claim 16, wherein the authentication hardware server is an authentication, authorization and accounting (AAA) server.

18. The system as claimed in claim 16, wherein the authentication proxy hardware server is an authentication, authorization and accounting (AAA) proxy server.

19. The system as claimed in claim 18, wherein the AAA proxy server is provided in a gateway node.

20. The system as claimed in claim 16, wherein at least one of the first and the second node of the mesh network is an end user device.

21. The system as claimed in claim 16, wherein at least one of the first and the second node of the mesh network is a wireless local area network (WLAN) access node.

22. A method of providing a mesh key used to encrypt messages between a first mesh node and a second mesh node, the method comprising:
receiving a session key at the second mesh node from an authentication server;
determining whether the received session key is a mesh key used to encrypt messages between the first mesh node and the second mesh node; and
deriving the mesh key from the received session key using a predefined key derivation function when it is determined that the received session key is not a mesh key,
wherein the step of deriving the mesh key from the session key by means of the key derivation function is carried out by the second node which receives the session key directly in an extensible authentication protocol success message, and
recognizing by the second node that the key derivation function is still to be performed if said message does not contain the associated indicator flag.

\* \* \* \* \*